United States Patent [19]

Miyata et al.

[11] Patent Number: 5,745,288

[45] Date of Patent: Apr. 28, 1998

[54] TRANSMISSION TYPE PROJECTION SCREEN

[75] Inventors: Hideki Miyata; Makoto Honda, both of Tokyo, Japan

[73] Assignee: Dai Nippon Printing Co., Ltd., Japan

[21] Appl. No.: 867,880

[22] Filed: Jun. 3, 1997

Related U.S. Application Data

[63] Continuation of Ser. No. 432,020, May 1, 1995, abandoned.

[30] Foreign Application Priority Data

May 12, 1994 [JP] Japan ................. 6-115831

[51] Int. Cl.[6] .................................. G03B 21/60
[52] U.S. Cl. .................................. 359/457; 359/455
[58] Field of Search .................... 359/443, 453, 359/455, 456, 400

[56] References Cited

U.S. PATENT DOCUMENTS 4,108,540  8/1978  Anderson et al. ................. 350/211
5,066,099  11/1991  Yoshida et al. ................... 359/457
5,111,337  5/1992  Martinez .......................... 359/443
5,296,922  3/1994  Mitani et al. ..................... 359/457
5,307,205  4/1994  Ludwig, Jr. et al. ............. 359/453
5,426,531  6/1995  Tsukogoshi ...................... 359/457

FOREIGN PATENT DOCUMENTS 3-12236  2/1991  Japan.

*Primary Examiner*—Daniel P. Malley
*Attorney, Agent, or Firm*—Parkhurst & Wendel

[57] ABSTRACT

A transmission type projection screen is provided with a transparent film attached adhesively to only opaque or shading parts formed on top surfaces of ridges provided on the front surface of a lens sheet. The lens sheet is provided on its rear surface with a plurality of lenses for condensing light projected by a light source. The shading parts do not receive the light condensed by the plurality of lenses. The film protects the front surface of the lens sheet of the screen, and prevents scattering of the lens sheet in fragments when the lens sheet is cracked.

16 Claims, 4 Drawing Sheets

TRANSMISSION TYPE PROJECTION SCREEN

This is a continuation of application Ser. No. 08/432,020 filed May 1, 1995, now abandoned.

BACKGROUND OF THE INVENTION

1. Field of the Invention

The present invention relates to a transmission type screen for use in a rear-projection type projector, such as a video-projector or a slide projector.

2. Description of the Prior Art

A lenticular lens sheet formed of a synthetic resin, such as polymethyl methacrylate, has been used alone or in combination with another lens sheet in a video-projector or a slide projector. One of the known lenticular lens sheets is provided with a plurality of parallel, vertically elongate shading layers arranged at intervals on the front surface, i.e., the surface facing the viewer, to form shading areas that do not transmit image light. Another known lenticular lens sheet is provided with a plurality of parallel, vertically elongate protrusions on the front surface, i.e., the surface facing the viewer, lenses arranged between adjacent protrusions, and shading layers formed on the top surfaces of the protrusions, respectively.

Since the lenticular lens sheet is placed to face the viewer, the following problems arise when practically using those known lenticular lens sheets. First the shading layers are liable to come off and the shading layers come off easily when the same are scratched with nails or the like when cleaning the lenticular lens sheet. Secondly, the acrylic resin and the vinyl chloride resin are easily scratched or abraded. Particularly, the lenses formed on the front surface and the protrusions are minute structures of a synthetic resin having a comparatively low scratch resistance and hence they are very easily damaged and, consequently, the image light projecting performance of the lenses is impaired. Thirdly, the lens sheet cracks readily and scatters in dangerous sharp fragments when shocked and, therefore, it has been desired to improve the safety against shocks (hereinafter referred to as "scatter resistance").

To solve such problems in the known lenticular lens sheets, a method disclosed in Japanese Utility Model Laid-open (Kokai) No. 3-12236 (published Feb. 7, 1991) bonds a protective plate of an inorganic glass, an acrylic resin or the like to the front surface of the screen, and another known method superposes a scratch-resistant film finished by hard-coating on the lens sheet. However, the protective plate, such as an acrylic resin plate or an organic glass plate, requires work for attaching the protective plate to the screen, deteriorating productivity, and the expensive protective plate increases the cost of the screen. Accordingly, a low-cost transmission type screen with a protective function has been desired. As regards scatter resistance, nothing effective in enhancing scatter resistance has yet been proposed.

Although the scratch-resistant film laminated on the front surface of the lenticular lens sheet is effective in avoiding forming minute scratches in the lenses, the shading layers, similarly to those of the ordinary screen, are easily damaged and cracked because the shading layers are formed on the scratch-resistant film after shaping. Moreover, since the lens pattern and the protrusions are formed after the scratch-resistant film has been stuck to the base sheet or simultaneously with the process for bonding the scratch-resistant film to the base sheet when forming a lenticular lens sheet having a front surface applied with the scratch-resistant film, sharp matters enter and are caught in furrows formed between adjacent protrusions and the protrusions are shaved by the sharp matters.

In a transmission type screen comprising the aforesaid lenticular lens sheet and another lens sheet in combination, the difference in moisture absorption between the component lens sheets reduces the adhesion between the component lens sheets, which makes the transmission type screen unable to exert its full performance.

SUMMARY OF THE INVENTION

Accordingly, it is an object of the present invention to provide a scratch resistant transmission type projection screen having a front surface provided with lenses and shading layers and having excellent scatter resistance to prevent the scatter of fragments in case the transmission type projection screen is shocked and broken.

Another object of the present invention is to provide a low-cost transmission type projection screen capable of satisfactorily forming an image thereon when the same is used in combination with another lens sheet.

With the foregoing objects in view, the present invention provides a transmission type projection screen comprising a single or a plurality of lens sheets for condensing and diffusing light and characterized in that a plurality of lenses for condensing light emitted by a light source are formed in the rear surface of the foremost lens sheet, i.e., the lens sheet facing the viewer, and a transparent film is attached adhesively to opaque parts of the front surface of the lens sheet.

According to the present invention, the film attached to the opaque parts of the front surface of the lens sheet protects the lens sheet from scratching and provides the lens sheet with scatter resistance. Thus, the transmission type projection screen having scatter resistance can be fabricated at a comparatively low cost. The use of the film facilitates additionally providing the screen with antireflection, antistatic and external light absorbing functions.

When the lens sheet is formed continuously by extrusion molding, the film can be attached continuously to the molded lens sheet and, consequently, the lens sheet can be produced at a high productive efficiency and at a low manufacturing cost.

The lens sheet may be provided with protrusions or ridges on the opaque parts and a transparent film may be attached adhesively to the ridges, which facilitates attaching the film adhesively to the lens sheet.

Lenses may be formed between the ridges of the lens sheet to which the film is attached, which enables the protection of the lens sheet provided with lenses on the front surface maintaining the design of the lenses.

A substantially transparent adhesive layer may be formed on the surface of the film on the side of the light source and the film may be attached adhesively by the adhesive layer to the top surfaces of the ridges of the lens sheet, which simplifies the manufacturing process.

Shading layers may be formed on the opaque parts of the front surface of the lens sheet, and the film may be attached adhesively to the shading layers. When the lens sheet is provided with ridges on the opaque parts, the shading layers may be formed on the top surfaces of the ridges, and the film may be attached adhesively to the shading layers, which reduces the reflection of external light and enables the transmission type projection screen to display contrasting images.

The film may be attached to the front surface of the lens sheet with a black adhesive layer. The black adhesive layer reduces the reflection of external light and enables the transmission type projection screen to display images with improved contrast, and simplifies the manufacturing process because the shading layers and the adhesive layer can be formed simultaneously.

The film may be selected taking into consideration of the properties of the resin forming the lens sheet so that the hygroscopic elongation percentage of the film is lower than that of the lens sheet, which enables the screen to display sharp images.

The front surface of the transparent film may be coated with a hard coating layer. The hard coating layer coating the front surface of the transparent film protects the transparent film from scratching and prevents the deterioration of the appearance of the screen.

The front surface, i.e., the surface facing the viewer, of the film may be provided with lenticular lenses for vertical diffusion, prisms for vertical optical axis correction, or a linear Fresnel lens having horizontal ridges (hereinafter referred to as "lens pattern for changing vertical optical characteristics"), principally for refracting projected light, which facilitate changing the vertical angle of view, reduces the reflection of external light and enables the observation of clear images.

The lens pattern for changing the vertical optical characteristics may be formed of an ionizing-radiation-curing resin having a hardness higher than that of the film. The lens pattern of the ionizing-radiation-curing resin increases the surface hardness of the film and further enhances the lens sheet protecting effect of the same.

The film may be colored for external light absorption. The colored film facilitates obtaining a transmission type projection screen capable of displaying images in satisfactory contrast.

The film may be colored so that the colored film has a maximum transmittance to radiations of wavelengths around 450 nm and a minimum transmittance to radiations of wavelengths around 570 nm.

Preferably, only the front surface of the film, both the surfaces of the film and/or the front surface of the lens sheet is treated by antistatic finishing to prevent the adhesion of dust to the front surface of the film and the interface between the film and the lens sheet and the entrance of dust into spaces between the film and the front surface of the lens sheet. Thus, the antistatic finishing prevents the reduction of the transmittance and the deterioration of the appearance of the screen attributable to dust adhering to the front surface of the film and dust entering the spaces between the film and front surface of the lens sheet.

The lens sheet may be formed of a shock-resistant acrylic resin. The strength of a transmission type projection screen employing a lens sheet formed of a shock-resistant acrylic resin is far greater than that of the ordinary screen.

The above and other objects, features and advantages of the present invention will become more apparent from the following description taken in connection with the accompanying drawings.

DESCRIPTION OF THE PREFERRED EMBODIMENTS

Figure 1:
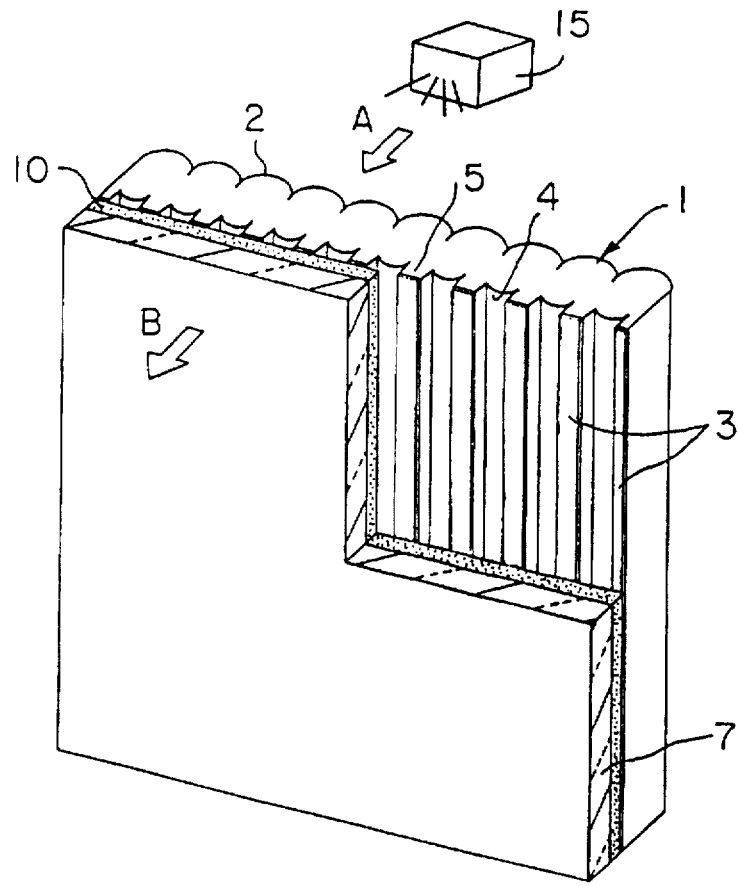
FIG. 1 is a partly cutaway perspective view of a transmission type projection screen in a first embodiment according to the present invention.
Figure 1A:
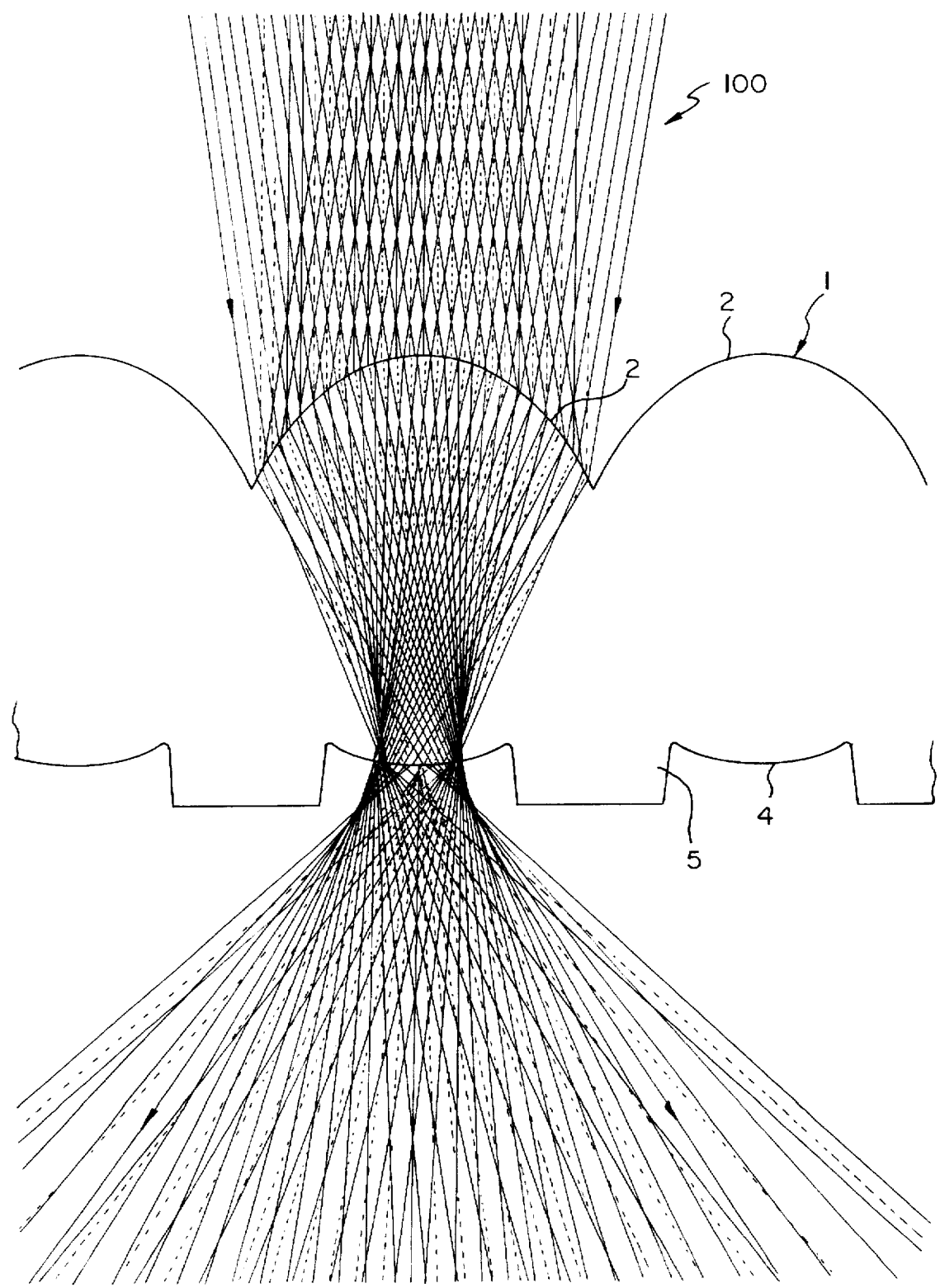
FIG. 1A is a cross sectional view of a lens sheet showing light rays passing therethrough.

Referring to FIG. 1 showing a transmission type projection screen (hereinafter referred to simply as "screen") in a first embodiment according to the present invention in a perspective view, the screen comprises a transparent film 7, a transparent adhesive layer 10, light-absorbing shading layers 3 and a lens sheet 1, which are arranged in that order from the front side, i.e., the side of the viewer, to the rear side in close contact with each other. The lens sheet 1 is the rearmost component facing a light source (not shown) i.e., a projector. The lens sheet 1 is provided with known vertical lenticular lenses 2 on its rear surface, and a plurality of parallel vertical ridges 5 on its front surface. Forward convex lenses 4 are formed between adjacent ridges 5. As shown in FIG. 1A, light rays 100, projected toward a rear surface of lens sheet 1, are condensed by vertical lenses 2 and are subsequently diffused by convex lenses 4 on the front surface of the lens sheet 1. As shown, light rays 100 are condensed such that ridges 5 receive virtually none of the projected light. Thus, when light is projected through lens sheet 1, the front side of lens sheet 1 exhibits, with respect to the projected light, bright parts at locations corresponding to convex lenses 4 and dim parts corresponding to ridges 5. Preferably shading layers 3 are formed on the front surfaces of the ridges 5, respectively. Shading layers 3 function to black out incident light falling on the lens sheet 1 from a front side thereof. However, shading layers 3 do not themselves impact the effect of lenticular lenses 2 and convex lenses 4 to create bright and dim parts, with respect to projected light rays 100, on the front side of lens sheet 1. The film 7 is attached adhesively to the front surface of the lens sheet 1 by the adhesive layer 10.

It is to be noted that the film 7 is attached adhesively only to the surfaces of the shading layers 3 covering the front surfaces, i.e., the top surfaces, of the ridges 5 by the adhesive layer 10, and the surfaces of the convex lenses 4 are separated from the film 7 and the adhesive layer 10. The light projected by the projector and falling on the screen in a direction indicated by the arrow A in FIG. 1 travels forward through the lens sheet 1, only part of the light traveling portions of the lens sheet 1 other than those corresponding to the shading layers 3, i.e., opaque parts, travels further through the transparent film 7 and travels toward the viewer as indicated by the arrow B.

Figure 2:
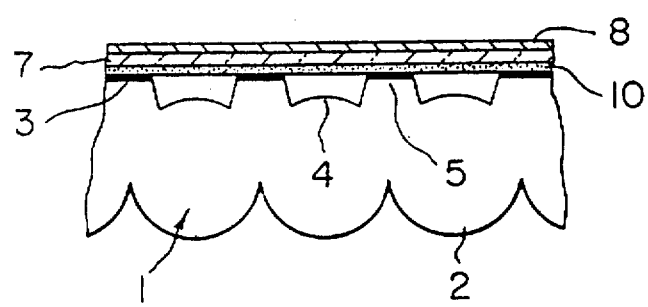
FIG. 2 is a fragmentary cross-sectional view of a transmission type projection screen in a second embodiment according to the present invention.

FIG. 2 shows a screen in a second embodiment according to the present invention in a fragmentary cross-sectional view. This screen comprises, in addition to components corresponding to and arranged similarly to those of the screen in the first embodiment, a hard coating layer 8 formed over the front surface of a transparent film 7 facing the viewer.

Figure 3:
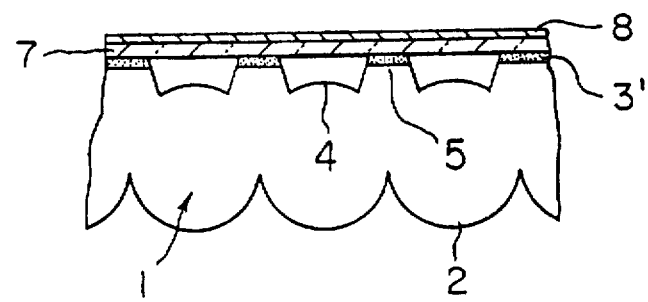
FIG. 3 is a fragmentary cross-sectional view of a transmission type projection screen in a third embodiment according to the present invention.

Referring to FIG. 3 a screen in a third embodiment according to the present invention comprises a hard coating layer 8, a transparent film 7, black adhesive layers 3', a lens sheet 1 arranged in that order from the front backward. The black adhesive layers 3' are formed on the top surfaces of ridges 5 formed on the lens sheet 1, respectively, and serves as shading layers as well as means for adhesively attaching the film 7 to the lens sheet 1.

The lens sheet 1 may be formed of a transparent synthetic resin. Synthetic resins suitable for forming the lens sheet 1 are acrylic resins, such as a polymethyl methacrylate resin (PMMA), vinyl chloride resins, polycarbonate resins, polystyrene resins and such. It is preferable, from the viewpoint of preventing cracking due to shocks, to form the lens sheet 1 of an acrylic resin of a shock resistance grade produced by polymerizing a combination of an acrylic resin and rubber or by dispersing rubber in an acrylic resin. The lens sheet 1 may be formed of an ionizing-radiation-curing resin, such as an epoxyacrylate resin, a urethane acrylate resin or an unsaturated polyester resin.

The film 7 is formed of a transparent resin, such as a polyethylene terephthalate (PET) resin when the lens sheet 1 is formed of an acrylic resin or a polypropylene resin when the lens sheet 1 is formed of a polycarbonate resin. Preferably the adhesive forming the adhesive layers 10 is an adhesive that exerts its adhesive property when subjected to a certain condition, such as hot-pressing or ultrasonic wave application, for example, a copolymer of vinyl chloride and vinyl acetate or a copolymer of ethylene and vinyl acetate (EVA). The black adhesive layer 3' may be formed of a material produced by dispersing carbon particles in the aforesaid adhesive.

Figure 4:
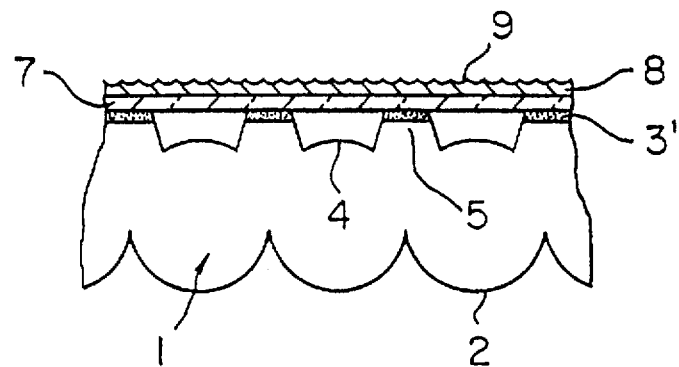
FIG. 4 is fragmentary cross-sectional view of a transmission type projection screen in a fourth embodiment according to the present invention.
Figure 5:
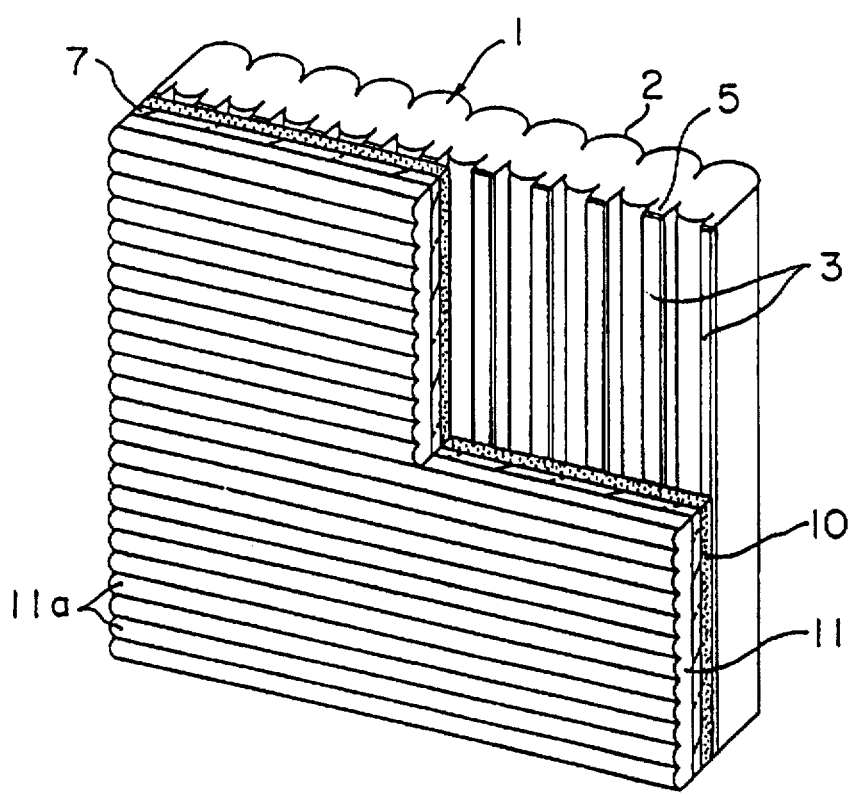
FIG. 5 is a partly cutaway perspective view of a transmission type projection screen in a fifth embodiment according to the present invention.

As shown in FIG. 4, irregularities 9 may be formed in the surface of the hard coating layer 8 by antiglare-finishing to diffuse external light, or the surface of the hard coating layer 8 may be coated with an antireflection coating. As shown in FIG. 5, a lens pattern 11 consisting of horizontal ridges 11a may be formed in the front surface of the transparent film 7 to change the vertical optical characteristics of transmitted light, or the front surface of the lens pattern 11 may be treated with an antireflection coating.

Although the lens sheet 1 employed in each of the foregoing embodiments illustrated by the drawings is provided with the parallel lenticular lenses 2 on its rear surface, the lens sheet 1 may be provided with fly-eye lenses on its rear surface and with opaque parts for light projected by a light source on its front surface.

The transparent film 7 adhesively attached to the opaque parts of the front surface of the lens sheet 1 of the screen in accordance with the present invention protects the front surface of the lens sheet 1, and remains unbroken and holds fragments of the lens sheet 1 even when the lens sheet 1 is fractured by shocks to prevent the scatter of the fragments of the fractured lens sheet 1.

The hard coating layer 8 coating the front surface of the film 7 protects the film 7 and enhances the scratch resistance of the film 7.

In the screen of the present invention, the film 7 is attached only to the opaque parts of the front surface of the lens sheet 1 and is not attached to the entire front surface of the lens sheet 1 so that the transmissive parts of the lens sheet 1 that transmit light projected by the light source are separated from the film 7 or the adhesive layer 10. Therefore, the film 7 is able to protect the front surface of the lens sheet 1 without affecting the optical characteristics of the transmissive parts of the lens sheet 1.

Since the material forming the film is selectively determined so that the hygroscopic elongation percentage (i.e., how much the film elongates upon absorption of moisture) of the film 7 is smaller than that of the lens sheet 1, the screen warps in a curved shape convex toward the light source when the screen absorbs moisture and, consequently, the adhesion of the screen to a lens sheet, such as a Fresnel lens sheet, having optical functions different from those of the lens sheet 1 and disposed on the rear side of the lens sheet 1 is enhanced and the deterioration of the sharpness of images due to the separation of the screen from the lens sheet can be prevented.

The lens pattern 11 formed on the front surface of the film 7 changes the vertical optical characteristics of the transmitted light. When the lens pattern 11 is formed of an ionizing-radiation-curing resin having a hardness higher than that of the film 7, the lens pattern 11 has a high strength and satisfactory scratch resistance, and exerts a reflection reducing effect similar to that which may be provided by the antiglare treatment of the surface of the film 7.

Furthermore, in accordance with the present invention, the film 7 may be colored with dye or pigment for an external light absorbing function to improve the contrast of images. Since the output of the blue image projector of the current projection system is lower than those of the other two projectors for images of the other two colors, images brighter than those displayed when the transmittances to radiations of wavelengths in the entire wavelength range of visible radiations are reduced uniformly, can be displayed and the intensity of reflected light can be reduced by coloring the film 7 so that the colored film 7 has a maximum transmittance to radiations of wavelengths around 450 nm and a minimum transmittance to radiations of wavelengths around 570 nm corresponding to the wavelength at which visual sensitivity becomes maximum, and the transmittance of the screen to blue light may not be reduced.

Figure 7:
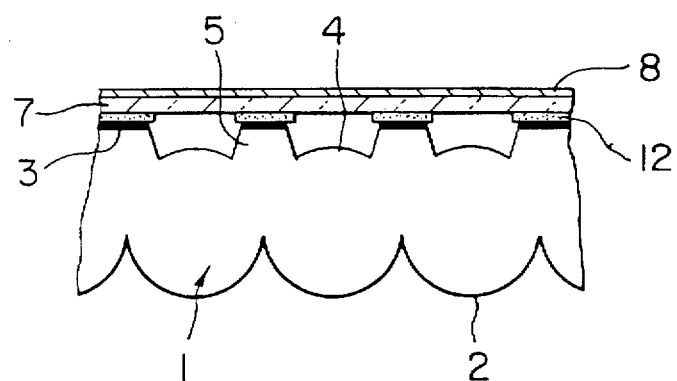
FIG. 7 is a fragmentary cross-sectional view of assistance in explaining disadvantages in the use of an ordinary adhesive.

When the black adhesive layers 3' or the transparent adhesive layers 10 are formed of an adhesive that exerts its adhesive property when subjected to hot-pressing or the like, the adhesion of dust to the surfaces of the black adhesive layers 3' or the adhesive layers 10 can be prevented, and it is possible to avoid problems caused by the bulging of an ordinary adhesive 12 (FIG. 7) applied to the opaque parts 3 when the film 7 is attached to the opaque parts.

Since the front surface of the lens sheet 1 is covered with the film 7, external light at the viewer's side may be reflected by the film 7. However, since the film is attached adhesively to the black adhesive layers 3' or the shading layers 3, external light from the viewer's side falling on the black adhesive layers 3' or the shading layers 3 is not reflected but absorbed. Therefore, the reflectance of the screen of the present invention is lower than that of the conventional screen provided with the protective plate stuck thereto, and the screen is able to display images with an improved contrast.

The present invention will be described in further detail in connection with concrete examples.

EXAMPLE 1

Referring to FIG. 1, an acrylic resin lenticular lens sheet 1 of 930×700 mm in size was formed by extrusion molding. The lenticular lens sheet 1 was provided with front lenticular lenses 4 arranged at pitches of 0.8 mm and ridges 5 formed between adjacent front lenticular lenses 4. The ratio between the lenticular lenses 4 and the ridges 5 was 52:48. Shading layers 3 were formed on the top surfaces of the ridges 5, respectively, by printing. A 4 μm thick adhesive layer 10 of a copolymer of vinyl chloride and vinyl acetate was formed over one major surface of a 125 μm thick PET film 7 of 930×700 mm in size and the PET film 7 was bonded to the lenticular lens sheet 1 at 200° C. and at a speed of 3 m/min by hot-lamination using a thermal transfer roll. The PET film 7 was bonded only to the top surfaces of the ridges 5 coated with the shading layers 3 that form opaque parts for the light projected by a light source. Thus, a screen provided with the transparent PET film 7 was obtained. The front lenticular lenses 4, the ridges 5 and the shading layers 3 formed on the top surfaces of the ridges 5 were hard to damage. Falling ball impact test of the screen proved that the lenticular lens sheet does not scatter in fragments when the same is cracked.

EXAMPLE 2

Referring to FIG. 2, a shock-resistant acrylic resin lenticular lens sheet 1 of 930×700 mm in size was formed by extrusion molding. The lenticular lens sheet 1 was provided with front lenticular lenses 4 arranged at pitches of 0.8 mm and ridges 5 formed between adjacent front lenticular lenses 4. The ratio between the lenticular lenses 4 and the ridges 5 was 52:48. Shading layers 3 were formed on the top surfaces of the ridges 5, respectively by printing. A 5 μm thick hard coating layer 8 of an acrylic hard coating material was formed on the front surface of a 125 μm thick PET film 7, a 4 μm thick adhesive layer 10 of a copolymer of vinyl chloride and vinyl acetate was formed over the rear surface of the PET film 7, and then the PET film 7 was bonded to the lenticular lens sheet 1 at 200° C. and at a speed of 3 m/min by hot-lamination using a thermal transfer roll.

The surface hardness of the film 7 determined through pencil hardness tests was 2H or above, and the results of scratch resistance test of the film 7, in which the surface of the film 7 was rubbed with steel wool, was satisfactory and the appearance of the screen was scarcely spoiled. Falling ball impact test of the screen proved that the lenticular lens sheet does not scatter in fragments when the same is cracked.

EXAMPLE 3

Referring to FIG. 4, a shock-resistant acrylic resin lenticular lens sheet 1 of 930×700 mm in size was formed by extrusion molding. The lenticular lens sheet 1 was provided with front lenticular lenses 4 arranged at pitches of 0.8 mm and ridges 5 formed between adjacent front lenticular lenses 4. The ratio between the lenticular lenses 4 and the ridges 5 was 52:48. Shading layers 3' of a copolymer of vinyl chloride and vinyl acetate containing carbon particles was formed in a thickness of 5 μm on the top surfaces of the ridges 5, respectively, by offset printing. A hard coating layer 8 having an antiglare surface 9 was formed on one major surface of a 125 μm thick PET film 7 by spreading a UV-curing hard coating ink in a film over the major surface of the PET film 7, imprinting the film of the UV-curing hard coating ink with an irregular roughened pattern formed on the surface of an imprinting plate by sand blasting or the like, and curing the film of the UV-curing hard coating ink by exposing the film of the UV-curing hard coating ink to UV radiation. The PET film 7 coated with the hard coating layer 8 was superposed on the lenticular lens sheet 1 with the other major surface thereof opposite the major surface coated with the hard coating layer 8 in contact with the surface of the lenticular lens sheet 1 provided with the ridges 5, and the lenticular lens sheet 1 and the PET film 7 were bonded together by hot-lamination at 200° C. and at a speed of 3 m/min compressing the superposed lenticular lens sheet 1 and the PET film 7 between thermal transfer rolls. Thus, a screen having an antiglare property and provided with the front lenticular lenses 4 and the ridges 5 protected by the PET film 7 was completed. Falling ball impact test of the screen proved that the lenticular lens sheet does not scatter in fragments when the same is cracked.

EXAMPLE 4

Referring to FIG. 5, a shock-resistant acrylic resin lenticular lens sheet 1 having a vertical diffusion half-angle of 5° was formed. The lenticular lens sheet 1 was provided with front lenticular lenses 4 arranged at pitches of 0.85 mm and ridges 5 having top surfaces coated with shading layers 3 formed by printing. The ratio between the front lenticular lenses and the ridges 5 was 55:45. A 125 μm thick PET film 7 provided with lenticular lenses 11 having a vertical diffusion half-angle of 4° for vertical diffusion and arranged at pitches of 0.1 mm in its front surface and a 4 μm thick adhesive layer 10 of a copolymer of vinyl chloride and vinyl acetate on its rear surface was bonded to the front surface of the lenticular lens sheet 1 at 200° C. and at a speed of 3 m/min by hot-lamination using thermal transfer rolls so that the rear surface coated with the adhesive layer 10 is joined to the front surface of the lenticular lens sheet 1. The vertical diffusion lenticular lenses 11 were formed by spreading a UV-curing acrylic resin hard coating ink having a hardness, when cured, higher than that of the PET film 7 over the front surface of the PET film 7 and imprinting the film of the UV-curing acrylic resin ink with a pattern corresponding to the arrangement of the lenticular lenses 11.

The vertical diffusion half-angle of the screen thus fabricated was larger than that of the lenticular lens sheet 1 proper by 20%. Images reflected in the front surface of the screen were obscured by the vertical diffusion lenticular lenses 11, which proved the antiglare effect of the vertical diffusion lenticular lenses 11. The surface hardness of the PET film was high, the lenticular lens sheet 1 was hard to scratch, and the lenticular lens sheet 1 did not scatter in fragments when the same was cracked.

EXAMPLE 5

Figure 6:
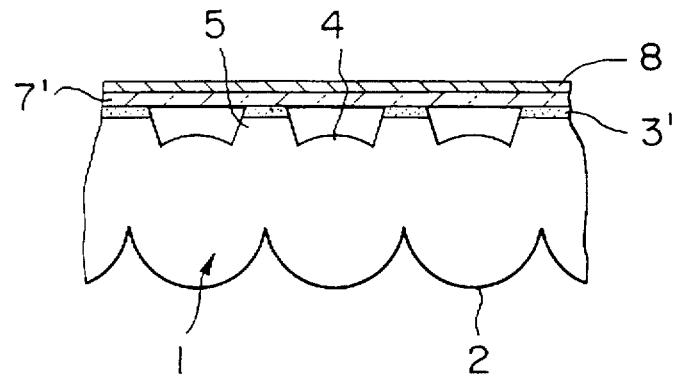
FIG. 6 is a fragmentary cross-sectional view of a transmission type projection screen in a sixth embodiment according to the present invention.

Referring to FIG. 6, a shock-resistant acrylic resin lenticular lens sheet 1 of 930×700 mm in size provided with front lenticular lenses 4 arranged at pitches of 0.85 mm and ridges 5 formed between adjacent front lenticular lenses 4 was formed. The ratio between the front lenticular lenses 4 and the ridges 5 was 55:45. Black adhesive layers 3' of a copolymer of vinyl chloride and vinyl acetate containing carbon particles were formed in a thickness of 4 μm on the top surfaces of the ridges 5 by offset printing. A PET film 7' provided with a hard coating layer and colored so that the PET film 7' and having a maximum transmittance to wavelengths around 450 nm and a minimum transmittance to wavelengths around 570 nm was bonded to the lenticular lens sheet 1 at 200° C. and at a speed of 3 m/min by hot-lamination using thermal transfer rolls to complete a screen.

The contrast ratio of images displayed on the screen thus fabricated was greater than that of images displayed on the lenticular lens sheet proper by 28%, and was greater than that of images displayed on the screen provided with a clear film by 10%. The surface hardness of the PET film was high, the lenticular lens sheet was hard to scratch and the lenticular lens did not scatter in fragments when the same was cracked.

EXAMPLE 6

A lenticular lens sheet 1 of 930×700 mm in size provided in its front surface with front lenticular lenses 4 arranged at pitches of 0.85 mm and ridges 5 formed between adjacent lenticular lenses 4 was formed, the front surface of the lenticular lens sheet 1 was finished by an antistatic treatment, in which a 2 wt.% aqueous solution of a cationic antistatic agent (Eletrostripper QN, KAO K.K.) was sprayed over the front surface of the lenticular lens sheet 1 with a spray gun and air-dried, and shading layers 3 were formed on the top surfaces of the ridges 5 by printing. The ratio between the front lenticular lenses 4 and the ridges 5 was 55:45. A 125 μm thick PET film 7 provided with a 4 μm thick adhesive layer 10 of a copolymer of vinyl chloride and vinyl acetate on its rear surface on the side of the lenticular lens sheet 1 was bonded to the lenticular lens sheet 1 at 200° C. and at a speed of 3 m/min by hot-lamination using thermal transfer-rolls to complete a screen.

The surface resistivity of the PET film forming the front surface of the screen was $2.5 \times 10^{10}$ Ω/□ as measured by a surface resistivity measuring method specified in JIS K6911. The contrast ratio of images displayed on the screen was sufficiently high and the results of observation of an image of a test pattern displayed on the screen and the visual inspection of white uniformity after the screen had been kept in normal environment for one month were satisfactory. The quality of images displayed on the screen was not spoiled with dust and the falling ball impact test of the screen proved that the screen does not scatter in fragments when the same is cracked.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A transmission type projection screen having a single or a plurality of lens sheets for condensing and diffusing light, comprising:

lens sheet means having a front side directed to a viewer and a rear side directed to a light source;

a plurality of lenses provided on the rear surface of said lens sheet means at mutually spaced relation along said rear surface, said lenses condensing, on said front side, light received from the light source such that said front side will have dim parts which do not receive the light condensed by said lenses and bright parts which do receive the light condensed by said lenses;

at least one adhesive layer contacting said front side of said lens sheet means only at said dim parts; and a continuous transparent protective film attached to said front side of said lens sheet means via only said at least one adhesive layer, whereby air-gaps are formed between said bright parts and said transparent protective film.

2. A transmissive type projection screen according to claim 1, wherein said dim parts are in the form of ridges on said front side of said lens sheet means and said transparent protective film is attached to said ridges.

3. A transmission type projection screen according to claim 2, further comprising:

front lenses formed between adjacent ridges, respectively.

4. A transmission type projection screen according to claim 3, wherein said front lenses are convex lenses.

5. A transmission type projection screen according to claim 1, wherein said transparent protective film is attached to said front side of said lens sheet means via a substantially transparent adhesive layer.

6. A transmission type projection screen according to claim 1, further comprising:

a shading layer provided between each of said dim parts and said transparent protective film.

7. A transmission type projection screen according to claim 1, wherein said transparent protective film is attached to said dim parts with black adhesive layers, respectively.

8. A transmission type projection screen according to claim 1, wherein said transparent protective film has a hygroscopic elongation percentage smaller than that of said lens sheet means.

9. A transmission type projection screen according to claim 1, further comprising:

a coating layer applied to a surface of said transparent protective film, opposite said lens sheet means.

10. A transmission type projection screen according to claim 9, wherein said coating layer has irregularities formed in an exposed surface thereof.

11. A transmission type projection screen according to claim 1, wherein said lenses provided on said rear side of said lens sheet means are vertical lenticular lenses.

12. A transmission type projection screen according to claim 1, wherein said transparent protective film is colored to absorb external light.

13. A transmission type projection screen according to claim 12, wherein said transparent protective film has a maximum transmittance to wavelengths around 450 nm and a minimum transmittance to wavelengths around 570 nm.

14. A transmission type projection screen according to claim 1, wherein at least one of a front surface of the transparent protective film, a rear surface of said transparent protective film, and said front side of said lens sheet means is finished by an antistatic treatment.

15. A transmission type projection screen according to claim 1, wherein said lens sheet means comprises an acrylic resin.

16. A transmission type projection screen according to claim 1, wherein said transparent protective film has a front surface formed with lenticular lenses for vertical light diffusion.

* * * * *